Patented June 10, 1930

1,762,364

UNITED STATES PATENT OFFICE

EDWARD H. SNYDER AND WILLIAM D. GREEN, OF BAUER, UTAH, ASSIGNORS TO COMBINED METALS REDUCTION COMPANY, OF STOCKTON, UTAH, A CORPORATION OF UTAH

CONCENTRATION OF OXIDIZED ORES OF LEAD, SILVER, AND COPPER

No Drawing. Application filed January 25, 1928. Serial No. 249,494.

This invention relates to the concentration of oxidized ores of lead, silver and copper by flotation. The concentration of sulfid ores by flotation is extensively practiced; but the attempt to concentrate oxidized ores by flotation involves considerable difficulties, especially when the ore contains considerable quantities of iron oxide, manganese oxide, shale, clay or other materials that tend to form large quantities of slow settling slimes. Although there are enormous quantities of oxidized ores of this type and numerous attempts have been made to devise a practical process for concentrating them by flotation, it has heretofore been commercially impracticable to concentrate such ores by flotation, due principally to the low recoveries on account of the gangue aggregates including much valuable mineral and due also to the concentrates being of low grade on account of the entrainment of slow settling slimes by the froth.

The principal object of the present invention is to overcome such difficulties and devise a practical process of concentrating oxidized ores of lead, silver and copper by flotation and especially such oxidized ores as contain material that tend to form slow settling slimes.

In the ordinary process of flotation, the ore is finely ground in a ball mill or the like, water is added thereto to form a pulp, and the pulp is passed into a flotation cell along with a small quantity of oil or other frothing agent and agitated with air or otherwise treated so as to form a froth which collects at the surface of the cell, which froth contains most of the valuable mineral and is removed at the surface of the cell while most of the gangue material is removed at a lower point. As stated above, processes of this type are extensively used in the treatment of sulfid ores.

According to the present invention, oxidized or partly oxidized ores of lead, silver and/or copper are used, and the treatment of the pulp in the flotation cell is effected in the presence of sodium chloride and sodium sulfid, the treatment in other respects following common flotation practice. The sodium chloride may be introduced in the dry form into the ore in the ball mill; but is preferably added in the form of a solution either to the pulp or to the ore itself. Likewise the sodium sulfid may be added either in the dry form or in a solution at any point, provided it has sufficient time to react throughout the pulp before the cell treatment of the pulp is completed. In most cases it is preferable to mix the sodium sulfid in dry form with the ore in the ball mill. The quantities of sodium chloride and sodium sulfid are subject to variation dependent on the characteristics of the ore.

The use of sodium chloride and sodium sulfid in the flotation treatment of oxidized ores of lead, silver and copper results in a very satisfactory recovery of the valuable mineral and in a high concentration thereof in the froth. Apparently the action of the sodium chloride is to disperse the gangue material and thereby prevent it from adhering to the silver, lead and copper minerals and to prevent it from being carried into the froth. After treatment with sodium chloride the particles of valuable mineral appear to be left fairly clean and amenable to reaction with the sulfid. Such reaction results in converting some of the valuable oxidized mineral into a sulfid or in forming a sulfid coating thereon that causes such modified mineral to act after the manner of a natural sulfid.

It may be that there is a reaction of the sodium chloride with the valuable mineral as an intermediate step in the conversion of part of the valuable mineral into sulfid. However this may be, the use of sodium chloride in connection with the sulfid very greatly enhances the recovery of the valuable mineral and increases the degree of concentration thereof and the grade of the concentrate whereas the attempt to sulfidize the mineral in a water pulp would result in poor recovery and a low grade concentrate.

The practice of the invention will be illustrated by the following examples:

Example No. 1

A charge of oxidized ore of silver and lead was ground in a ball mill with a quantity of sodium chloride equivalent to 400 pounds per ton of ore and a quantity of sodium sulfid equivalent to 6 pounds per ton of ore together with sufficient water to make a 1 to 1 pulp. When the grinding was completed the charge was removed from the ball mill, diluted with water to 30% solids and treated in a flotation cell in accordance with ordinary flotation practice. A high grade concentrate containing most of the oxidized silver and lead was obtained, as will appear from the following tabulation, namely:

*Assays of products*

| Product | Ozs. Ag | Percent. Pb | Percent. insol. |
|---|---|---|---|
| Heads | 17.98 | 27.6 | 41.0 |
| Concentrate | 29.42 | 43.8 | 17.0 |
| Cleaner tailings | 8.81 | 17.5 | 63.2 |
| Final tailings | 4.83 | 3.5 | 66.8 |

The following tabulation shows the percentages of the total silver and lead contained in the ore that were recovered in various products as well as the percentage of the total weight represented by each product:

| Product | Percent. of total weight | Percent. of total silver | Percent. of total lead |
|---|---|---|---|
| Heads | 100.0 | 100.0 | 100.0 |
| Concentrate | 55.8 | 87.2 | 91.8 |
| Cleaner tailings | 3.8 | 1.8 | 2.6 |
| Final tailings | 40.4 | 11.0 | 5.6 |

*Example No. 2*

A charge of oxidized ore of silver and lead was ground in a ball mill with a quantity of sodium chloride equivalent to 200 pounds per ton of ore and a quantity of sodium sulfid equivalent to 12 pounds per ton of ore together with sufficient water to make a 1 to 1 pulp. When the grinding was completed the charge was removed from the ball mill, diluted with water to 30% solids and treated in a flotation cell with .01 pound of pine oil per ton of ore. A high grade concentrate containing most of the oxidized silver and lead was obtained, as will appear from the following tabulation, namely:

*Assay of products*

| Product | Ounces silver | Ounces gold | Percent. lead | Percent. insol. | Percent. iron |
|---|---|---|---|---|---|
| Heads | 12.69 | 0.11 | 20.4 | 55.1 | 6.6 |
| Concentrate | 36.23 | 0.185 | 54.6 | 16.4 | 1.7 |
| Cleaner tailings | 9.75 | 0.120 | 14.1 | 56.0 | 9.2 |
| Final product | 5.88 | 0.080 | 9.7 | 61.6 | 9.8 |
| Final tailings | 3.08 | 0.060 | 2.1 | 81.4 | 6.4 |

The percentages of the total silver, gold, and lead contained in the ore that were recovered in the various products, as well as the percentage of the total weight of the heads represented by each product, are shown in the following tabulation:

| Product | Percent. of total weight | Percent. of total silver | Percent. of total gold | Percent. of total lead |
|---|---|---|---|---|
| Heads | 100.0 | 100.0 | 100.0 | 100.0 |
| Concentrate | 27.6 | 71.5 | 46.0 | 75.2 |
| Cleaner tailings | 22.0 | 15.2 | 24.2 | 15.5 |
| Final product | 10.6 | 4.5 | 7.8 | 5.1 |
| Tailings | 39.8 | 8.8 | 22.0 | 4.2 |

It is noted that if an ore contains a sulfid or sulfids that are amenable to concentration by ordinary flotation practice, the flotability of such sulfid portion is not adversely affected by our process of conditioning the ore; but on the contrary, the dispersion and deflocculation of the gangue due to the sodium chloride expedite the flotation and enhance the recovery of such sulfid portion. Our process is thus applicable not only to fully oxidized ores but to ores that are only partly oxidized, that is, ores that contain sulfid mineral as well as oxidized mineral.

It is obviously a great advantage of our process that it conditions ores for flotation treatment that have heretofore not been economically amenable to flotation treatment, especially oxidized ore associated with gangue containing large quantities of iron oxide, manganese oxide, shale, clay or other matter that tends to form slow settling slimes. The concentrate produced from such ores when treated by this process not only contains most of the valuable mineral but is of high grade and of a character most desirable for smelting. The term "oxidized minerals", as used herein, is used in contradistinction to "sulfid minerals", and includes the oxides, carbonates, sulfates, phosphates, molybdates, vanadates, chlorides and bromides of the valuable metals contained in ores. Examples of the oxidized minerals of lead, to which our process is applicable, include minium, anglesite, pyromorphite, mimetite, cerrusite, crocoite, vanadinite, descloizite, wulfenite; the oxidized minerals of silver include cerargyrite, bromyrite, embolite; and the oxidized minerals of copper include cuprite, malachite, azurite, tenorite.

It is noted that sodium sulfid is a sulfidizing agent and is used as such in our process, but instead of sodium sulfid, it is practicable to substitute the sulfid of any alkali or alkaline earth metal. Ordinarily about one to twelve pounds of sodium sulfid per ton of ore is sufficient for practical purposes.

In the first example above set forth, 400 pounds of sodium chloride were used per ton of ore representing a brine containing about two hundred and fifty grams per liter of water whereas in the second example only 200 pounds of sodium chloride per ton of ore were used representing a brine containing about one hundred and twenty-five grams of sodium chloride per liter of water. We have found in practice that satisfactory results have been secured when 50 pounds per ton of ore was used with some ores. In practice, the quantity of sodium chloride used is greater for ores containing high percentages of iron oxide or clayey gangue material than is required for ores with clean quartz gangue; but, as it is a simple matter to recover the sodium chloride by suitable apparatus, the proportion of sodium chloride admits of considerable variation without much effect on the efficiency or economy of the operation.

As in most chemical processes, chemical reactions of the present process are stimulated by heat. Ordinarily, it is desirable to heat the pulp to a temperature of about 90° to 150° Fahrenheit, as we have found very satisfactory results with such temperature. With a lower temperature, the reactions are slower, whereas the cost of heating the pulp to a higher temperature makes it undesirable. The duration of the treatment of the ore pulp with sodium chloride and alkali sulfid varies somewhat in practice in accordance with ordinary flotation practice, the time interval ranging from about two minutes with some ore to twenty minutes with other ore.

In the ordinary process of flotation, a small quantity of oil, usually a small fraction of one percent by weight of the ore, is used as a frothing agent; and in accordance with common practice, we generally use a small fraction of one percent of oil for such purpose. Our experiments indicate, however, that sodium chloride is itself a frothing agent and we have successfully concentrated certain ores by our process without adding oil or any other frothing agent except sodium chloride. The test given as Example No. 1 above was made without the use of oil.

What we claim is:

1. The improvement in the flotation concentration of ores containing oxidized minerals of lead, silver or copper which consists in conditioning the ore with sodium chloride and a sulfidizing agent preparatory to froth flotation thereof.

2. The improvement in the flotation concentration of ores containing oxidized minerals of lead, silver or copper which consists in conditioning the ore in the form of a non-acid pulp with sodium chloride and a sulfidizing agent preparatory to froth flotation thereof.

3. The improvement in the flotation concentration of ores containing oxidized minerals of lead, silver or copper which consists in forming the ore into a non-acid pulp containing sodium chloride in the proportion of from about five to about twenty per cent of the weight of the dry ore.

4. The improvement in the flotation concentration of ores containing oxidized minerals of lead, silver or copper which consists in forming the ore into a pulp containing sodium chloride in solution in the proportion of from about five to about twenty percent of the weight of the dry ore and about one percent of a sulfidizing agent per ton of dry ore preparatory to froth flotation thereof.

5. The improvement in the flotation concentration of ores containing oxidized minerals of lead, silver or copper which consists in forming the ore into a pulp containing sodium chloride in solution in the proportion of from about one hundred grams to about two hundred and fifty grams of sodium chloride per liter of solution and about one percent of a sulfidizing agent per ton of dry ore and subjecting such pulp to froth flotation.

6. The improvement in the froth flotation concentration of ores containing oxidized minerals of lead, silver or copper which consists in forming the ore into a pulp containing sodium chloride in the proportion of from about ten to about twenty percent of the weight of the dry ore and about one percent of an alkali sulfid and subjecting such pulp to froth flotation.

7. The improvement in the froth flotation concentration of ores containing oxidized minerals of lead, silver or copper which consists in forming the ore into a pulp containing sodium chloride in the proportion of from about ten to about twenty percent of the weight of the dry ore and about one percent of sodium sulfid and subjecting such pulp to froth flotation.

8. The process of concentrating ores containing oxidized minerals of lead, silver or copper which consists in adding thereto sodium chloride and a sulfidizing agent and forming the same into a pulp, subjecting such pulp to froth flotation and recovering the resultant froth.

9. The process of concentrating ores containing oxidized minerals of lead, silver or copper which consists in forming the same into a pulp containing sodium chloride and a sulfidizing agent, subjecting such pulp to froth flotation and recovering the resulting froth, the weight of the sodium chloride being from about 200 pounds to about 400 pounds per ton of dry ore.

10. The process of concentrating ores containing oxidized minerals of lead, silver or copper which consists in forming the same into a pulp containing sodium chloride and sodium sulfid, subjecting such pulp to froth flotation and recovering the resulting froth, the weight of the sodium chloride being from about 200 pounds to about 400 pounds per ton of dry ore and the weight of sodium sulfid being about seven to twelve pounds per ton of dry ore.

11. The process of concentrating ores containing oxidized minerals of lead, silver or copper which consists in forming the same into a pulp containing sodium chloride and sodium sulfid, subjecting such pulp to froth flotation and recovering the resulting froth, the weight of the sodium chloride in the pulp being from about 100 grams per liter of water to about 250 grams per liter of water and the weight of sodium sulfid being about seven to twelve pounds per ton of dry ore.

Signed at Bauer, Utah, this 13th day of January, 1928.

EDWARD H. SNYDER.
WILLIAM D. GREEN.